No. 783,926. PATENTED FEB. 28, 1905.
M. E. BROOKE.
CUSHION TIRE ATTACHING MEANS.
APPLICATION FILED FEB. 29, 1904.
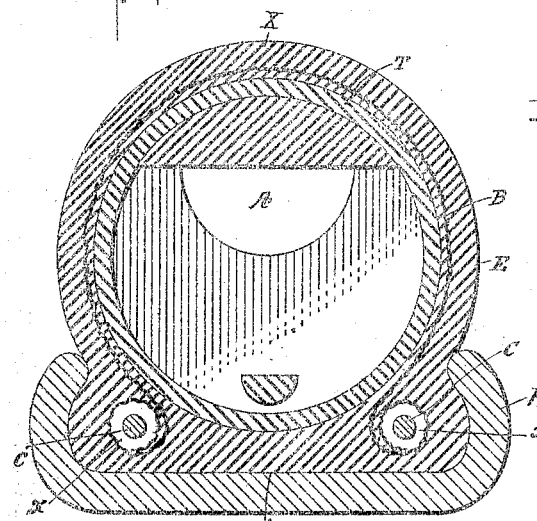
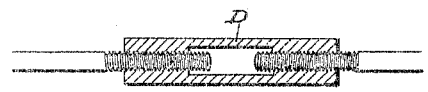
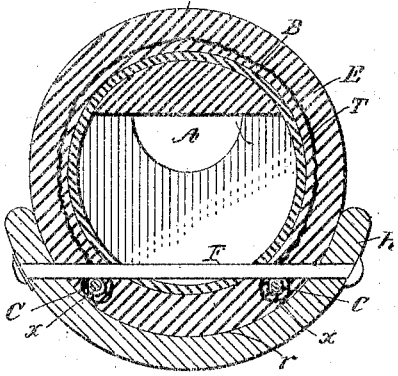
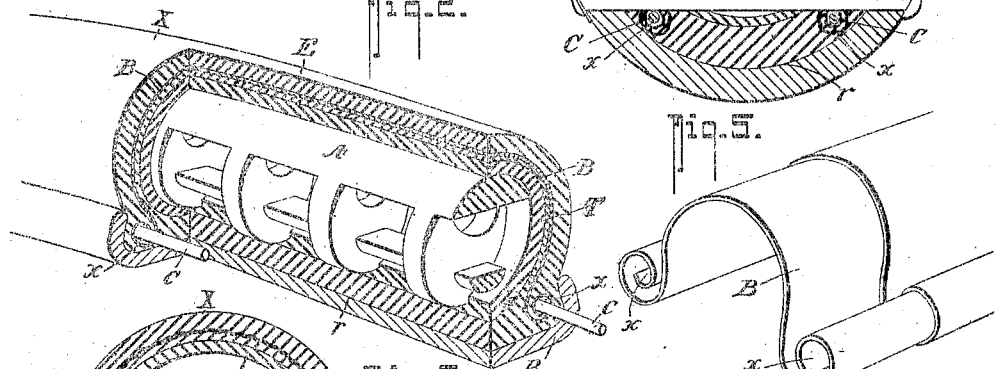
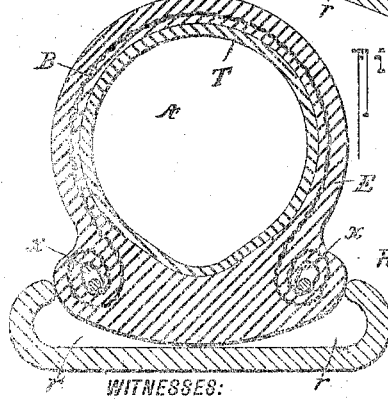
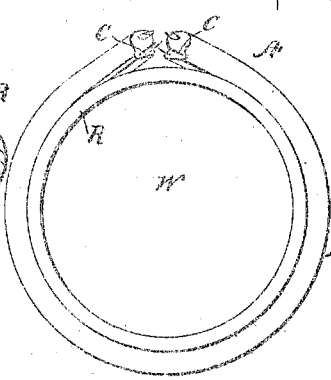
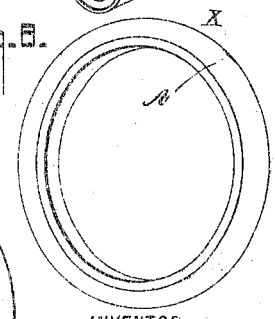
WITNESSES:
INVENTOR
Mary E. Brooke
BY
ATTORNEYS No. 783,926. Patented February 28, 1905.

UNITED STATES PATENT OFFICE.

MARY EDITH BROOKE, OF DENVER, COLORADO.

CUSHION-TIRE-ATTACHING MEANS.

SPECIFICATION forming part of Letters Patent No. 783,926, dated February 28, 1905.

Application filed February 26, 1904. Serial No. 195,467.

*To all whom it may concern:*

Be it known that I, MARY EDITH BROOKE, residing at Denver, in the county of Denver and State of Colorado, have invented a new and Improved Cushion-Tire-Attaching Means, of which the following is a specification.

My invention is an improvement in that form of composite tire for bicycles, automobiles, and the like which consists of an inner member and an outer inclosing member and means connected with the latter for holding both duly engaged and secured to the wheel-rim. I have devised certain improvements in the construction and arrangement of parts, whereby a stronger and more durable composite tire is produced and the same more securely attached to the wheel-rim. The details of construction and arrangement are as hereinafter described, reference being had to the accompanying drawings, in which—

Figure 1 is a transverse section of a cushion-tire and rim and my improved means for attaching the tire to the rim. Fig. 2 is a perspective view of a portion of the tire and my attaching means, parts of the tire being broken away and in section to better illustrate the arrangement of the said attaching means. Fig. 3 is a view illustrating one method of connecting the end of the fabric-holding wires hereinafter referred to. Fig. 4 is a cross-section of the tire and the attaching means and illustrating a slightly-modified arrangement of my invention. Fig. 5 is a view of a further modification hereinafter explained. Fig. 6 is a diagrammatic cross-section hereinafter referred to of a tire and rim with my improvements applied. Figs. 7 and 8 are detail views hereinafter specifically explained.

In the drawings I have illustrated a cushion-tire A of the type disclosed in my Patent No. 691,589, dated January 21, 1902; but I desire it understood my attaching means are not limited in their use to such form of cushion-tire.

My improved fastening or cushion-fastening means comprises, essentially, a fabric wrapping B of any suitable material, which is preferably combined with rubber. The fabric B is embedded in or entirely inclosed by the continuous, circular, and tubular rubber body or tire member E. The fabric B is preferably continuous in length, but may be made of overlapping sections, as represented in Fig. 5. The side edges of the fabric B are coiled or wound upon themselves, thus forming two continuous side passages around the tire, and in the said passages are arranged the continuous fastening-wires C C, which secure the composite tire to the wheel-rim, as shown. The wires C C have their ends joined in any approved manner—for example, by brazing or by joining with coupling sleeves or nuts D, having right and left threads to receive the correspondingly-threaded ends of the wires, as shown in Fig. 3. The wires C C are arranged in passages formed in the base of the thick rubber outer envelop or covering of the inner tire.

In the manufacture of my invention the wires C C are loosely inclosed in the outer covering E to provide for holding the entire composite tire to the rigid wheel-rim R. The spaces $x$ $x$ are made ample to permit of inserting coupling sleeves or nuts for wedging the material about the wires.

In the practical application of my invention in some cases the spaces $x$ $x$ are made large enough to provide, in addition to retaining the wires and the wedging material, for the easy compression of the tire-attaching means, so that the said means can be easily forced into the channel-rim of a wheel by compressing it as it passes between the narrow binding outer edges of such rims as are narrower at their edges than nearer their base, as indicated in the diagrammatic sectional view of Fig. 6.

By reason of the correlative arrangement of the parts, as just described, the qualities of the material in which the wires are inclosed will cause the attaching means to spring back to its constructed shape as soon as they pass the tread-surface of the rim for which the said means is molded.

While I have not shown it, it will be understood the tread-surfaces of the outer covering X may be molded with longitudinal or transverse corrugations; but while I have shown my invention as specially designed for a cushion-tire having a circular shape in cross-section the same without changing the correlation of the parts shown and described may be readily adapted for use with cushion-tires having different cross-sectional shape.

The inner cushion or inner tire A is arranged in the rubber cover E and is in direct contact with the latter throughout the length of both. In producing the outer member E the rubber composing it is molded upon the canvas fastening, so that the latter is completely inclosed or embedded in it, and thus in making up the the composite tire the canvas is at no point in contact with the inner member or tire A. Thus a comparatively safe and elastic medium is introduced at all points between the canvas and the practically unyielding tire A, and, what is more important, by such arrangement of the canvas the cover or outer member E is strengthened and supported throughout its length and secured to the wheel-rim when the special fastenings C are duly applied. In brief, by such arrangement of the canvas within the body of the elastic cover or outer tire member E the latter is not only strengthened, but the tire as a whole is rendered stronger and more durable and is more firmly secured to the wheel.

When the fabric B, the rubber casing E, and the spaces around the wires C C, and the wires themselves are all in place around the tire, the whole is then placed around the rim seat or channel of the wheel W in the manner shown in Fig. 7, after which the ends of the wires C C are drawn together, during which operation the tire and casing are slid back and forth along the wires, (see Fig. 7,) as is necessary to permit of the desired joining of the wires for making a perfect joining of the rubber and the fabric. The finished form is represented in Fig. 8. After the parts are thus assembled the space around the wires or in the tire-core is plugged with rubber or other suitable material to aid in making a perfect joint and for keeping out water, dirt, or sand from working into the tire. In thus applying my invention I employ a length of the tire in excess of the wheel-rim circumference and compress the additional length into the circumferential rim-seat of the wheel, and by so fitting the tire with the attaching means therefor the outer as also the attaching means are relieved of all longitudinal stretch or strain and the tread-surface T, thereby reducing the danger of glass, sharp rock, or other substances from cutting into the rubber.

In some cases, especially when the wheel-rim has a regular curvature in cross-section, as represented in Fig. 4, I arrange transverse fastening bolts or rods F for securing the composite tire to the wheel-rim and effectually preventing any tendency of the same to "creep," as well as to shift under lateral strain. As shown, the bolts F are arranged at suitable intervals in the circumference of the wheel-rim, passing through the latter, also through the outer member or cover E, also through a portion of the cushion-tire or inner member A, and upon or over the fastening-wires C. By this arrangement I form a secure fastening.

Having thus described my invention, what I claim, and desire to secure by Letters Patent, is—

1. The improved composite tire, consisting of an inner elastic member and an outer member which are formed separately, the outer member being composed of rubber having a fabric B entirely embedded and inclosed in its body, the side edges of such fabric being coiled and forming continuous circular passages, and continuous fastening-wires C extending through said passages and serving to secure the entire composite tire to the wheel-rim, substantially as described.

2. The improved composite tire consisting of an inner cushion-tire, an outer rubber cover inclosing the inner member with which it is in direct contact throughout its length, and a fabric which is embedded in the body of said cover and thus removed from the cushion-tire, and fastenings C connected with the side edges of the fabric in the manner described.

3. The combination, with a rigid wheel-rim having a trough shape in cross-section, of the composite tire comprising an inner solid or cushion tire, and an elastic or rubber cover therefor which entirely incloses same, a fabric arranged in the cover, circular fastening-wires connected with the side edges of such fabric and a series of cross-bolts F passing transversely through the wheel-rim, the cover, the fabric, and the inner or cushion tire, and over the fastening-wires in the manner described.

MARY EDITH BROOKE.

Witnesses:
FRANK A. BURNELL,
MARY C. LAMB.